US011616605B2

(12) United States Patent
Abedini et al.

(10) Patent No.: US 11,616,605 B2
(45) Date of Patent: Mar. 28, 2023

(54) FEEDBACK MECHANISM IN INTEGRATED ACCESS FRONTHAUL MULTI-HOP NETWORKS

(71) Applicant: QUALCOMM Incorporated, San Diego, CA (US)

(72) Inventors: Navid Abedini, Basking Ridge, NJ (US); Muhammad Nazmul Islam, Littleton, MA (US); Ashwin Sampath, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/191,431

(22) Filed: Mar. 3, 2021

(65) Prior Publication Data
US 2022/0286232 A1 Sep. 8, 2022

(51) Int. Cl.
*H04W 72/04* (2009.01)
*H04L 1/1809* (2023.01)
*H04L 5/00* (2006.01)
*H04B 7/155* (2006.01)

(52) U.S. Cl.
CPC .......... *H04L 1/1809* (2013.01); *H04B 7/155* (2013.01); *H04L 5/0055* (2013.01); *H04W 72/0406* (2013.01)

(58) Field of Classification Search
CPC ..... H04L 1/1809; H04L 5/0055; H04B 7/155; H04W 72/0406
See application file for complete search history.

(56) References Cited

U.S. PATENT DOCUMENTS

| | | | |
|---|---|---|---|
| 2005/0089057 A1* | 4/2005 | Kang | H04W 74/0816 370/445 |
| 2009/0073916 A1* | 3/2009 | Zhang | H04B 7/15542 370/315 |
| 2012/0320862 A1* | 12/2012 | Ko | H04B 7/0417 370/329 |
| 2017/0150481 A1* | 5/2017 | Gupta | H04W 72/04 |
| 2018/0227948 A1* | 8/2018 | Lu | H04W 74/004 |
| 2020/0029318 A1* | 1/2020 | Guo | H04W 72/042 |

* cited by examiner

*Primary Examiner* — Edan Orgad
*Assistant Examiner* — Malick A Sohrab
(74) *Attorney, Agent, or Firm* — Procopio, Cory, Hargreaves & Savitch LLP

(57) ABSTRACT

The apparatus may be a first device at a first RU (e.g., UE, base station, etc.). The first RU may be configured to receive, from a control unit, a configuration for relaying or repeating data received from a second RU to a receiving unit. The first RU may further be configured to determine whether first feedback associated with the data is received from the second RU. The first RU may also be configured to transmit second feedback to the receiving unit or the control unit, the second feedback including first information indicating at least one of the first feedback or whether the first feedback was received.

30 Claims, 10 Drawing Sheets

FEEDBACK MECHANISM IN INTEGRATED ACCESS FRONTHAUL MULTI-HOP NETWORKS

BACKGROUND

Technical Field

The present disclosure relates generally to communication systems, and more particularly, to a feedback mechanism in multi-hop networks (e.g., integrated access fronthaul (IAF) multi-hop networks).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of wireless communication, e.g., 5G NR, radio units (RUs) may be used as intermediate hops for uplink (UL) data. An intermediate-hop RU may relay or repeat, to a next hop RU, received UL data and/or feedback as to whether the UL data was received at the intermediate-hop RU. When using multiple intermediate hops, an UL-data destination device may not receive the UL data based on a failure of any of the intermediate-hop RUs to receive the UL data. If an UL data reception fails at the UL-data destination device, the UL-data destination device may request a retransmission. It may be beneficial to be able to identify intermediate-hop RUs at which the UL data was successfully received so as to request a retransmission from a particular intermediate-hop RU that (1) received (e.g., successfully received) the UL data and (2) is the fewest hops away from the UL-data destination device.

In an aspect of the disclosure, a method, a computer-readable medium, and an apparatus are provided. The apparatus may be a first device at a first RU (e.g., user equipment (UE), base station, etc.). The first device may be a processor and/or modem at the first RU or the RU itself. The first RU may be configured to receive, from a distributed unit (DU), a configuration for relaying or repeating data received from a second RU to a receiving unit, the receiving unit being one of a third RU, the DU, or a UE. The first RU may further be configured to determine whether first feedback associated with the data is received from the second RU. The first RU may also be configured to transmit second feedback to the receiving unit, the second feedback including first information indicating at least one of the first feedback or whether the first feedback was received.

In some aspects, the first RU may be configured to determine whether the data from the second RU is received, and the second feedback may further include second information indicating whether the data from the second RU was received. The first RU may also be configured to transmit (e.g., repeat or relay) the data to the receiving unit when the data is determined to be received from the second RU.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
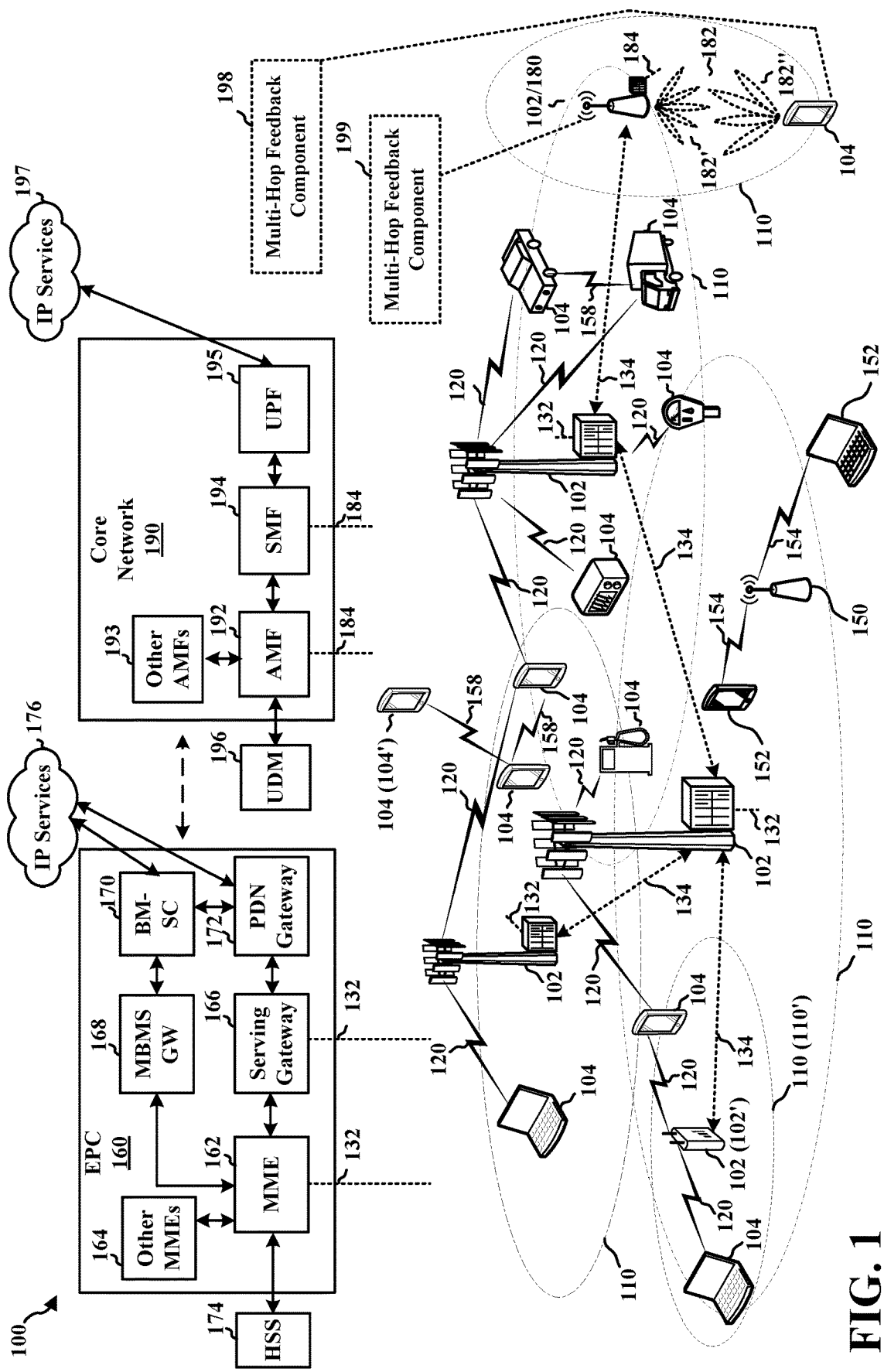
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR. Certain UEs 104' may utilize D2D communication link to participate in a multi-hop network from outside a coverage area 110.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a multi-hop feedback component 198 configured to receive, from a DU, a configuration for relaying or repeating data received from a second RU to a receiving unit, the receiving unit being one of a third RU, the DU, or a UE; determine whether first feedback associated with the data is received from the second RU; and transmit second feedback to the receiving unit, the second feedback including first information indicating at least one of the first feedback or whether the first feedback was received. In certain aspects, the base station 180 may be include a multi-hop feedback component 199 configured to receive, from a DU, a configuration for relaying or repeating data received from a second RU to a receiving unit, the receiving unit being one of a third RU, the DU, or a UE; determine whether first feedback associated with the data is received from the second RU; and transmit second feedback to the receiving unit, the second feedback including first information indicating at least one of the first feedback or whether the first feedback was received. Although the following description may be focused on 5G NR, the concepts described herein may be applicable to other similar areas, such as LTE, LTE-A, CDMA, GSM, and other wireless technologies.

Figure 2:
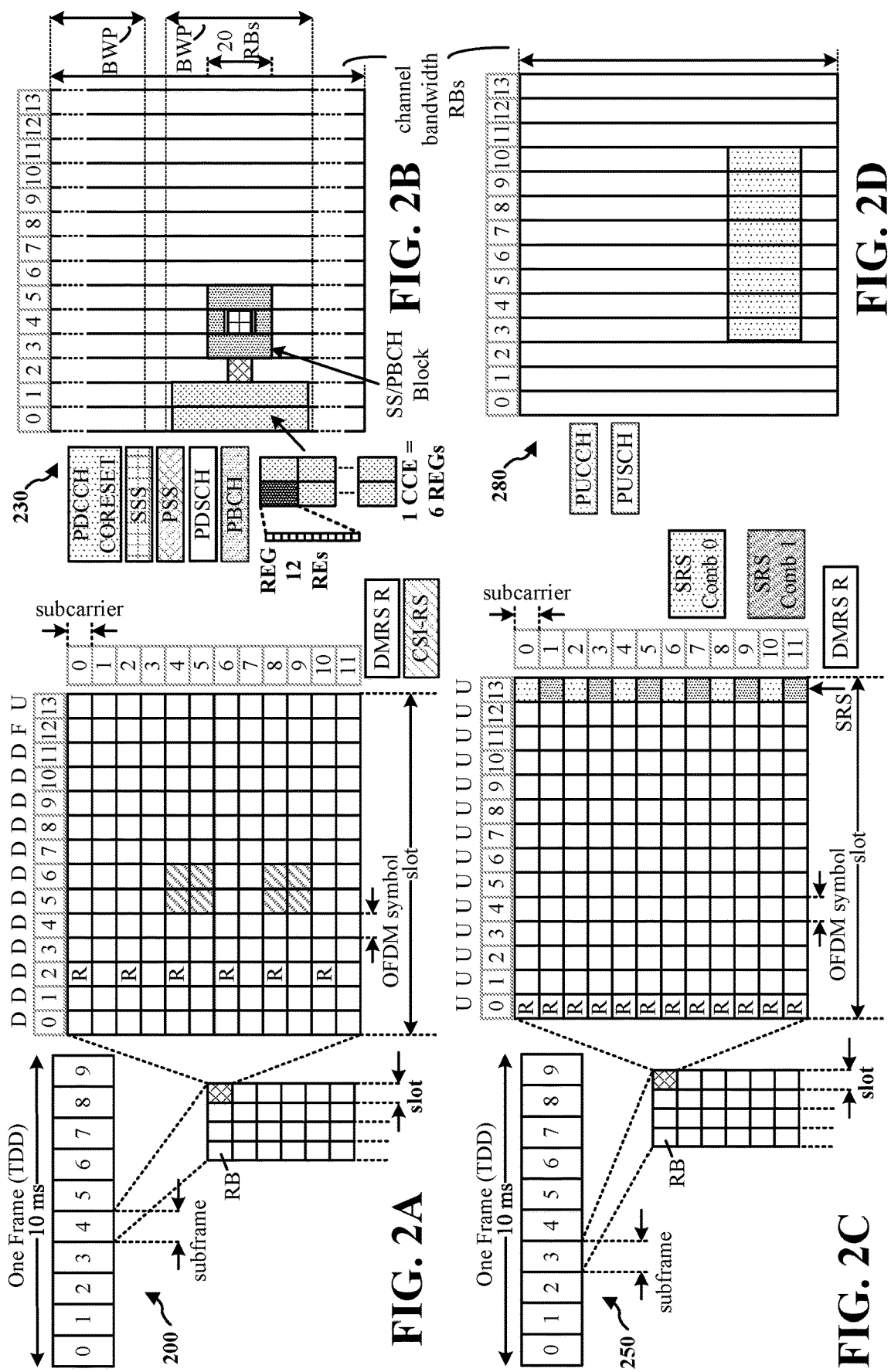
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
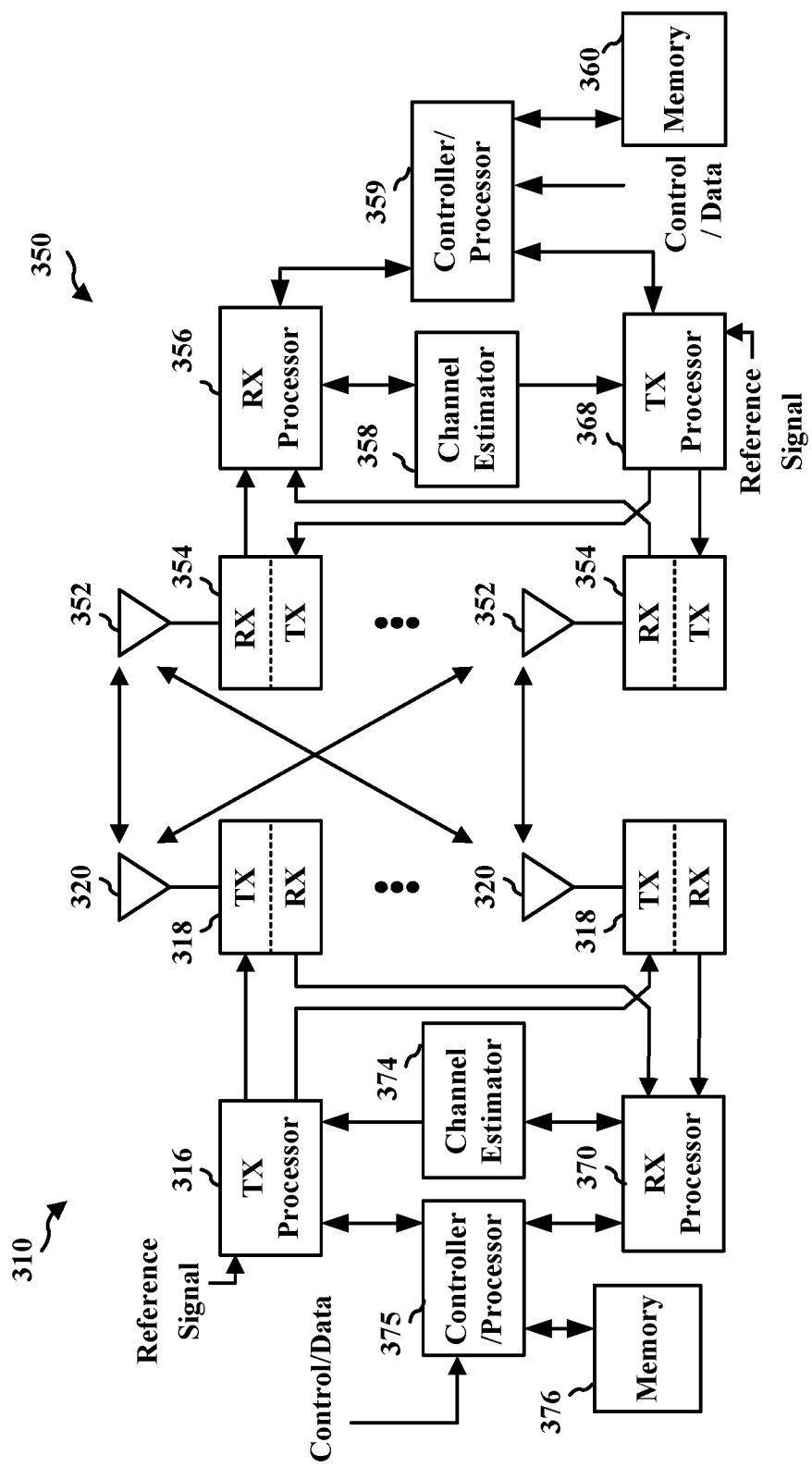
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which include s a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects of wireless communication, e.g., 5G NR, a single RU may be used as an intermediate hop for UL data (e.g., via a PUCCH, PUSCH, or, generically, "PUXCH") between an UL-data source device (e.g., a UE) and an UL-data destination device (e.g., a UE, RU, or DU). An intermediate-hop RU may relay or repeat, to the UL-data destination device, (1) UL-data received via PUXCH as UL-data via fronthaul (FH) PUSCH (FH-PUSCH) and/or (2) feedback as to whether the UL data transmitted via PUXCH was received at the intermediate-hop RU. The feedback may be used by the UL-data destination device (e.g., a UE, RU, or DU) to (1) schedule reception of the UL data transmitted via FH-PUSCH, (2) request a retransmission of the UL data based on the feedback indicating the failure of the intermediate-hop RU to receive the UL data via PUXCH, or (3) reallocate resources allocated for receiving the UL data based on the feedback indicating the failure of the intermediate-hop RU to receive the UL data via PUXCH.

When using multiple intermediate hops, an UL-data destination device may not receive the UL data (e.g., via a FH-PUSCH) based on a failure of any of the intermediate-hop RUs to receive the UL data (e.g., via a PUXCH or a FH-PUSCH). As in the single-hop example above, if an UL data reception fails at the UL-data destination device, the UL-data destination device may request a retransmission of the UL data. It may be beneficial to identify intermediate-hop RUs at which the UL data was successfully received so as to request a retransmission from a particular intermediate-hop RU that (1) received (e.g., successfully received) the UL data and (2) is the fewest hops away from the UL-data destination device.

Figure 4:
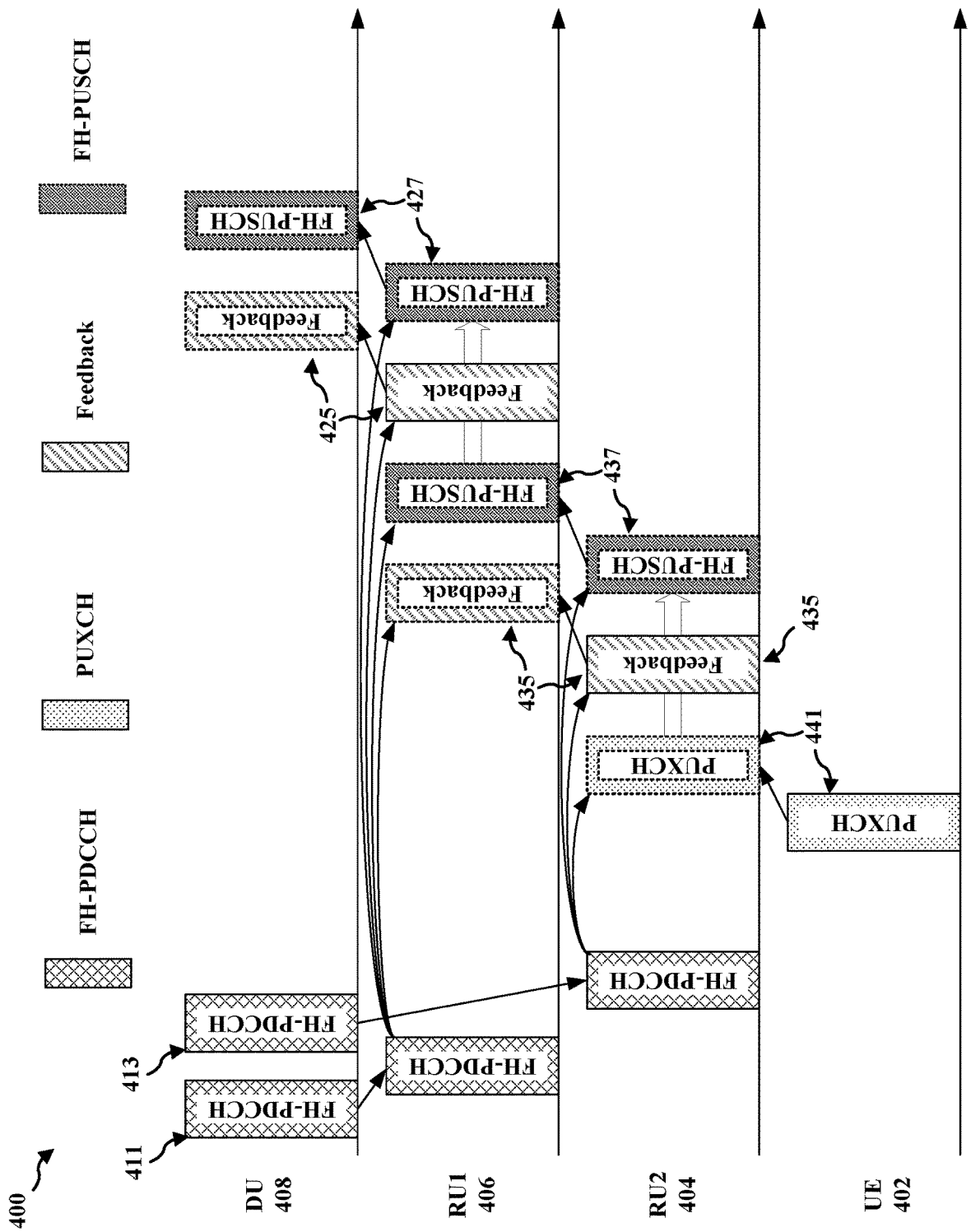
FIG. 4 is a diagram of UL data being forwarded in an IAF multi-hop network.

FIG. 4 is a diagram 400 of UL data being forwarded in an IAF multi-hop network (sometimes referred to as a multi-hop network for simplicity). Diagram 400 includes a DU 408 (e.g., a control unit, base station, etc.) that transmits control information via FH-PDCCH 411 (e.g., control information for an IAF multi-hop network for communication from UE 402 to DU 408) to RU1 406 and control information via FH-PDCCH 413 to RU2 404. The control information transmitted via FH-PDCCH 411 and 413 may identify, for RU1 406 and RU2 404, respectively, the time-and-frequency resources associated with the multi-hop network communications and/or the feedback type/format (e.g., number of bits, bit values indicating different states, etc.). UE 402 may transmit, to RU2 404, UL data via PUXCH 441 for RU2 404 to forward (relay or repeat) to RU1 406 as UL data via FH-PUSCH 437. RU1 406 may receive UL data via FH-PUSCH 437 and forward UL data via FH-PUSCH 427 to DU 408 (e.g., if RU1 406 received UL data via FH-PUSCH 437).

In some aspects, RU2 404 may also transmit feedback 435 to RU1 406 indicating whether RU2 404 received (e.g., successfully received) UL data via PUXCH 441. In some aspects, RU2 404 may determine whether UL data via PUXCH 441 was received based on one of a reference signal received power (RSRP), a reference signal received quality (RSRQ), a reference signal strength indicator (RSSI), a signal-to-noise ratio (SNR), or a signal-to-noise plus interference ratio (SINR), without attempting to decode the UL data via PUXCH. RU1 406 may receive (or monitor for) feedback 435 and may transmit feedback 425 indicating whether it received UL data via FH-PUSCH 437. In some aspects, the feedback 425 may also indicate whether RU1 406 received the feedback 435 and, if the feedback was received, the content of the feedback (e.g., the information indicated in the first feedback) or the feedback itself. Additional details of the feedback in a multi-hop network will be discussed in relation to FIGS. 5-8 below.

Figure 5:
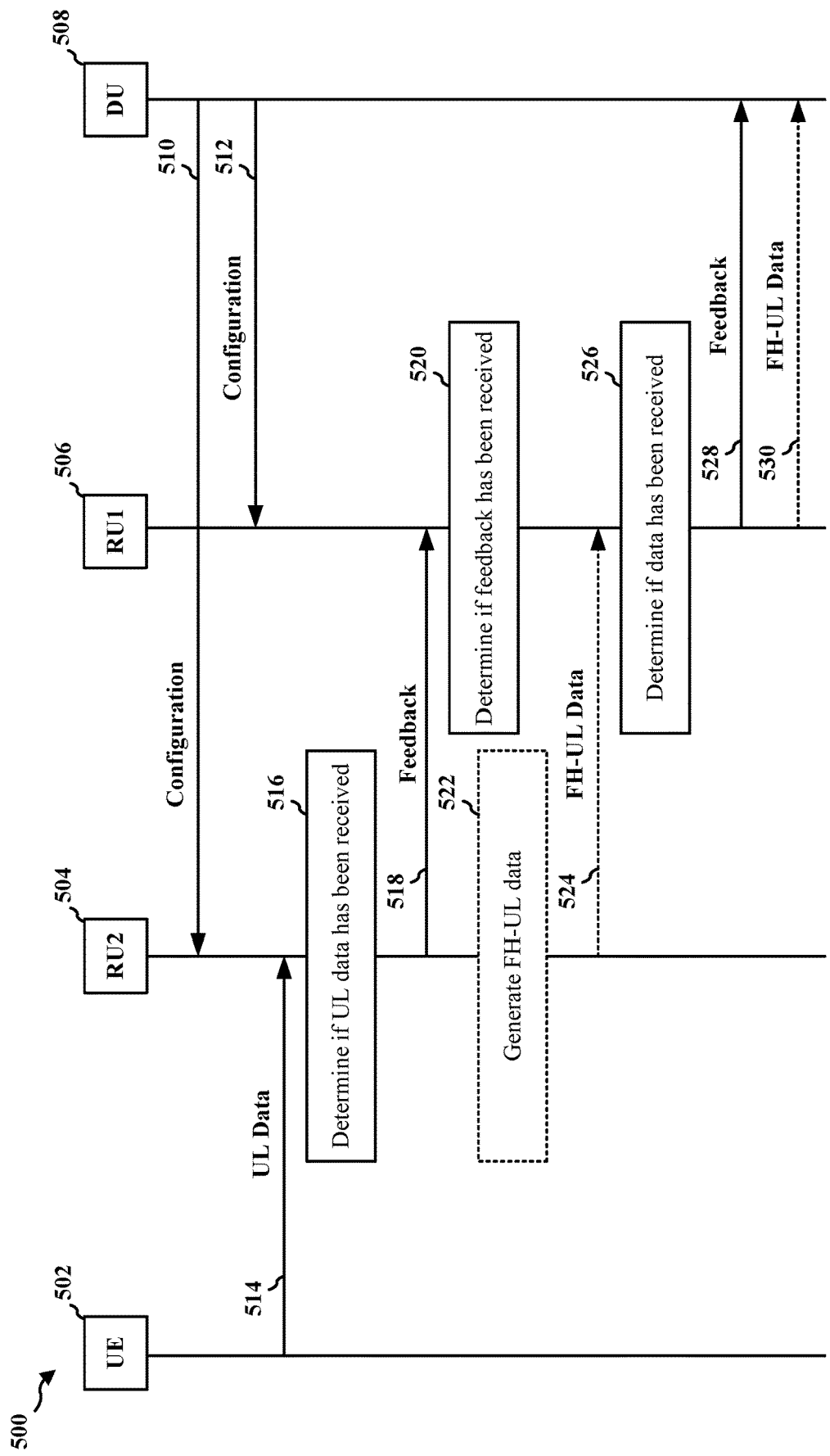
FIG. 5 is a call flow diagram of communication in a multi-hop network.

FIG. 5 is a call flow diagram 500 of communication in a multi-hop network (e.g., the multi-hop network of FIG. 4). Optional transmissions and operations are depicted with dotted lines. Call flow diagram 500 illustrates a DU 508 (e.g., a control unit, base station, UE, etc.) that may transmit configuration 510 (e.g., control information) for configuring RU2 504 to participate in a multi-hop network as a second intermediate hop (e.g., with hops numbered based on the number of hops from the DU 508). The DU 508 may also transmit configuration 512 for configuring RU1 506 to participate in the multi-hop network as a first intermediate hop. The configuration 510 and/or 512 may include time-and-frequency resources used to receive and transmit transmissions/data associated with UL data communication via the multi-hop network. The configurations 510 and 512 may indicate a signal-strength threshold based on one or more of a RSRP, a RSRQ, a RSSI, a SNR, or a SINR, where the signal-strength threshold may be used to determine if data (e.g., UL data via PUXCH or via FH-PUSCH) has been received at the intermediate-hop RU. For example, referring to FIG. 4, control information transmitted via FH-PDCCH 411 and 413 (e.g., configurations 512 and 510) may be transmitted to, and may be received by, RU1 406 (e.g., RU1 506) and RU2 404 (e.g., RU2 504), respectively. Control information transmitted via FH-PDCCH 411 (e.g., configuration 512) may specify the time-and-frequency resources for receiving feedback 435 (e.g., feedback 518) and FH-PUSCH 437 (e.g., FH-UL data 524). Control information transmitted via FH-PDCCH 411 may also specify the time-and-frequency resources for transmitting feedback 425 (e.g., feedback 528) and UL data via FH-PUSCH 427 (e.g., FH-UL data 530). Control information transmitted via FH-PDCCH 413 (e.g., configuration 510) may specify the time-and-frequency resources for receiving UL data via PUXCH 441 (e.g., UL data 514). FH-PDCCH 413 may also specify the time-and-frequency resources for transmitting feedback 435 and UL data via FH-PUSCH 437. The control information transmitted via FH-PDCCH 411 and/or 413 may indicate that UL data via PUXCH 441 and/or UL data via FH-PUSCH 437 are determined to be received if a reference signal associated with the PUXCH 441 and/or the FH-PUSCH 437 is measured to have one of a RSRP, a RSRQ, a RSSI, a SNR, or a SINR that is above a signal-strength threshold.

The configuration may also include an indication of a number of bits (e.g., b bits) for receiving a first feedback (e.g., feedback 518 from RU2 504) and a second number of bits (e.g., b, b+1, or b+2 bits) for transmitting a second feedback (e.g., feedback 528 from RU1 506). The configuration 510 and/or 512 may also include information about a feedback format (e.g., a mapping of feedback values to particular states of the multi-hop network for a particular UL communication). The configuration 510 and/or 512 may include information regarding an algorithm or other process for generating feedback (as will be described below in relation to at least FIGS. 6-8). Feedback formats that may be used in a multi-hop network will be discussed in more detail below in relation to FIGS. 6-8.

RU2 504 may receive UL data 514 (e.g., via a PUCCH or PUSCH) from UE 502 based on the configuration 510. Although not illustrated, it is to be understood that DU 508 and UE 502 may have negotiated or scheduled time-and-frequency resources used by UE 502 for transmitting the UL data 514. RU2 504 may determine 516 whether the UL data 514 was received. In some aspects, the RU2 504 may measure one or more of a RSRP, a RSRQ, a RSSI, a SNR, or a SINR and compare it to a signal-strength threshold to determine 516 whether the UL data 514 was received. In some aspects, the RU2 504 may determine 516 whether the UL data 514 was received by attempting to decode UL data 514 based on the time-and-frequency resources specified in configuration 510. Based on the determination 516, the RU2 504 may transmit feedback 518 to the RU1 506 indicating whether the UL data was received. For example, referring to FIG. 4, UE 402 (e.g., UE 502) may transmit PUXCH 441 (e.g., UL data 514) and RU2 404 (e.g., UE 504) may or may not receive PUXCH 441 (e.g., UL data 514) and provide feedback 435 (e.g., feedback 518) based on determining whether the PUXCH 441 (e.g., UL data 514) was received.

If the UL data 514 is successfully received, the RU2 504 may generate 522 a signal including FH-UL data 524 for relaying or repeating the received data to RU1 506. For example, referring to FIG. 4, RU2 404 (e.g., RU2 504) may receive PUXCH 441 (e.g., UL data 514) and generate FH-PUSCH 437 (e.g., FH-UL data 524). FH-PUSCH 437 may then be transmitted to RU1 406 (e.g., RU1 506).

In some instances, repeating the UL data 514 may refer to regenerating the signal including the UL data 514, which may then be transmitted as a signal including FH-UL data 524. Regeneration may be implemented in many different ways based on the amount of processing to be performed at the RU based on what is being regenerated (e.g., the analog signal, the time-domain (TD) in-phase and quadrature (IQ) samples, the frequency-domain (FD) IQ samples (tones), the symbols, the codeword, or the transport block). Similarly, relaying the UL data 514, may refer to generating a signal that includes the information in the UL data 514 which may then be transmitted as a signal including FH-UL data 524. Generating the signal may be implemented in many different ways based on the amount of processing to be done at the RU based on what information from the UL data 514 is being included in the generated signal (e.g., the signal used to transmit FH-UL data 524). For example, the generated signal may include one or more of information regarding (1) the TD IQ samples, (2) the FD IQ samples, (3) the symbols or antenna, (4) the codeword or log likelihood ratio (LLR), and/or (5) the transport block. After generating the (signal carrying) FH-UL data 524, the RU2 504 may transmit the FH-UL data 524 to RU1 506. If the UL data 514 was not received by RU2 504, the FH-UL data 524 may not be transmitted and the feedback 518 may identify that the UL data 514 was not received.

After feedback 518 is transmitted, RU1 506 may determine 520 whether the feedback 518 was received at RU1 506. If the feedback is received, and it includes an indication that the UL data 514 was not received at the RU2 504, the RU1 506 may not monitor time-and-frequency resources specified in configuration 512 for receiving FH-UL data 524 and may determine 526 that the FH-UL data 524 has not been received based on the feedback 518. If either (1) the feedback 518 is not received or (2) the feedback 518 indicates that the RU2 504 received the UL data 514, the RU1 may monitor time-and-frequency resources specified in configuration 512 for receiving FH-UL data 524. Based on monitoring the time-and-frequency resources specified in configuration 512 for receiving FH-UL data 524, the RU1 506 may determine 526 if the FH-UL data 524 was received. In some aspects, the RU1 506 may measure one or more of a RSRP, a RSRQ, a RSSI, a SNR, or a SINR and compare it to a signal-strength threshold (e.g., a pre-configured signal-strength threshold or a signal-strength threshold specified in configuration 512) to determine 526 whether the FH-UL data 524 was received. For example, referring to FIG. 4, RU1 406 (e.g., RU 506) may determine whether first feedback 435 (e.g., feedback 518) is received. Based on the content of feedback 435, the RU1 406 may determine to monitor, or not to monitor, the time-and-frequency resources associated with UL data transmitted via FH-PUSCH 437 (e.g., FH-UL data 524). If the RU1 406 determines to monitor for UL data via FH-PUSCH 437, then RU1 406, based on the monitoring, may determine whether it received UL data via FH-PUSCH 437.

After determining 526 whether FH-UL data 524 is received at the RU1 506, the RU1 506 may transmit, via time-and-frequency resources specified in configuration 512, feedback 528 indicating that the FH-UL data 524 was, or was not, received. The feedback, in some aspects, may be based on the determination 520 whether feedback 518 was received and/or the determination 526 whether the FH-UL data 524 was received. The feedback 528 may be formatted or generated based on information regarding a feedback format or an algorithm for generating feedback included in configuration 512. In some aspects, the feedback 528 may include one of the feedback 518 or the information included (i.e., indicated) in feedback 518. The feedback 528 may also indicate whether the feedback 518 was received and whether the FH-UL data 524 was received. For example, referring to FIG. 4, the RU1 406 (e.g., RU1 506) may determine if feedback 435 (e.g., feedback 518) and UL data via FH-PUSCH 437 (e.g., FH-UL data 524) were received and transmit feedback 425 (e.g., feedback 528) to DU 408 (e.g., DU 508). The transmitted feedback 425 may indicate whether feedback 435 and UL data via FH-PUSCH 437 were received and, in some aspects, may indicate the content of received feedback 435 (if feedback 435 was received at RU1 406).

If FH-UL data 524 was received, RU1 506 may transmit FH-UL data 530 to DU 508. FH-UL data 530, in some aspects, may be regenerated from FH-UL 524 or may be generated based on the data included in FH-UL data 524 as described in relation to the regeneration/generation of FH-UL data 524 from UL data 514. In other configurations of a multi-hop network, there may be additional intermediate hops that may perform similar operations to RU1 506, as will be discussed below in relation to FIGS. 6 and 7.

Figure 6:
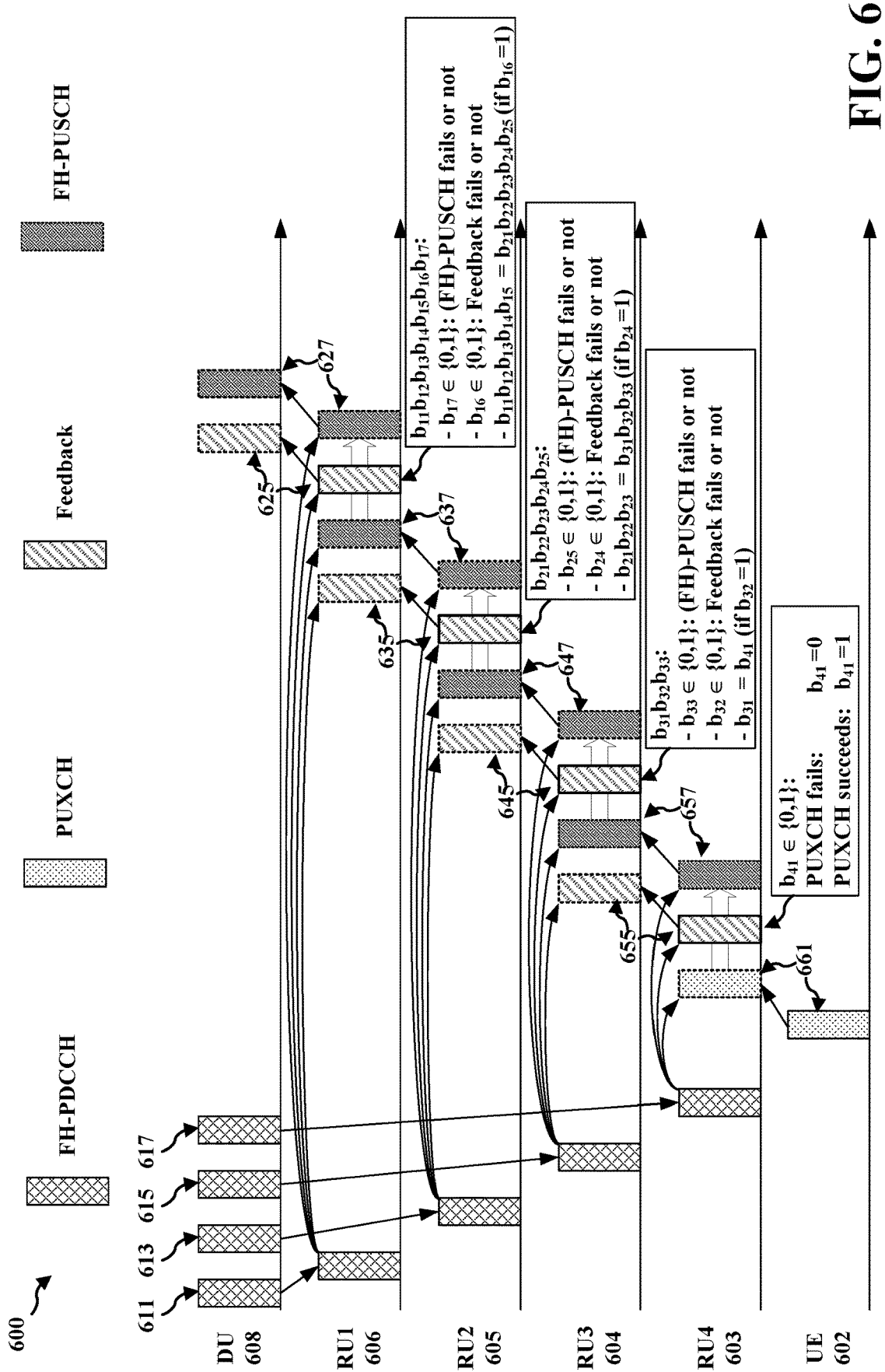
FIG. 6 is a diagram illustrating a feedback format in a multi-hop network.

FIG. 6 is a diagram 600 illustrating a feedback format in a multi-hop network. Diagram 600 illustrates a multi-hop network including a UE 602, four intermediate-hop RUs 603, 604, 605, and 606 (e.g., RU4-RU1), and a DU 608 (e.g., a control unit, base station, etc.). Optional transmissions are depicted with dotted lines. As described in relation to FIGS. 4 and 5, a DU 608 (e.g., DU 408 or 508) may transmit control information via FH-PDCCH 611, 613, 615, and 617 to RU1 606 to RU4 603, respectively to allow the RUs 606-603 to participate in the multi-hop network. Control information transmitted via FH-PDCCH 611-617 may include information as described in relation to configuration 510 and/or 512 relating to the time-and-frequency resources via which to receive and transmit transmissions/data (e.g., 661, 655, 657, 645, 647, 635, 637, 625, and 627) associated with UL data communication via the multi-hop network. Control information transmitted via FH-PDCCH 611-617 may include information regarding a feedback format or algorithm for generating feedback. The feedback format or algorithm may determine a number of bits used for transmitting the feedback (e.g., 655, 645, 635, and 625) to a next intermediate-hop RU (e.g., from RU3 to RU2). For example, the feedback 655 may include one bit of information, a "1" or "0," that indicates whether UL data transmitted via PUXCH 661 was received at RU4 603. The feedback 645 may include the one bit of feedback 655 (when feedback 655 is received) as a first bit ($b_{31}$), a second, additional bit ($b_{32}$) that indicates whether feedback 655 was received (e.g., "1") or not (e.g., "0"), and a third, additional bit ($b_{33}$) that indicates whether UL data via FH-PUSCH 657 was received (e.g., "1") or not received (e.g., "0"). At intermediate-hop RUs (e.g., RU2 605 and RU1 606), bits provided by a previous intermediate-hop RU and an additional two bits (e.g., "$b_{24}b_{25}$" or "$b_{16}b_{17}$") may be included in the feedback format used in the multi-hop network illustrated in FIG. 6.

In some aspects, the first feedback (e.g., feedback 635, "$b_{21}b_{22}b_{23}b_{24}b_{25}$"), in the feedback format described in relation to FIG. 6, may be determined to be received and the first RU is an $(i-1)^{th}$ hop (e.g., a $1^{st}$ hop corresponding to i=2) of n (e.g., 4) hops for the data where i≤n−1, and the first feedback (e.g., feedback 635, "$b_{21}b_{22}b_{23}b_{24}b_{25}$") includes an indication (e.g., a bit "$b_{24}$") whether an RU at hop i (e.g., RU2 605 at hop 2) received feedback from an RU at hop i+1 (e.g., RU3 604 at hop 3), the feedback (e.g., "$b_{31}b_{32}b_{33}$") received at the RU at hop i from the RU at hop i+1 when feedback is received at the RU at hop i from the RU at hop i+1, and an indication (e.g., a bit "$b_{25}$") whether the data is received at the RU at hop i from the RU at hop i+1. Accordingly, at RU1 606, first feedback 635 may be "XXX01" (where X may be either 0 or 1) to indicate that feedback 645 was not received but UL data via FH-PUSCH 647 was received. Alternatively, at RU1 606, first feedback 635 may be "11110" to indicate that feedback 645 was received and was "111" and that UL data via FH-PUSCH 647 was not received. Similarly, at RU2 605, first feedback 645 may be "111" to indicate that feedback 655 was received, that the feedback was a "1," and that UL data via FH-PUSCH 657 was received.

Figure 7:
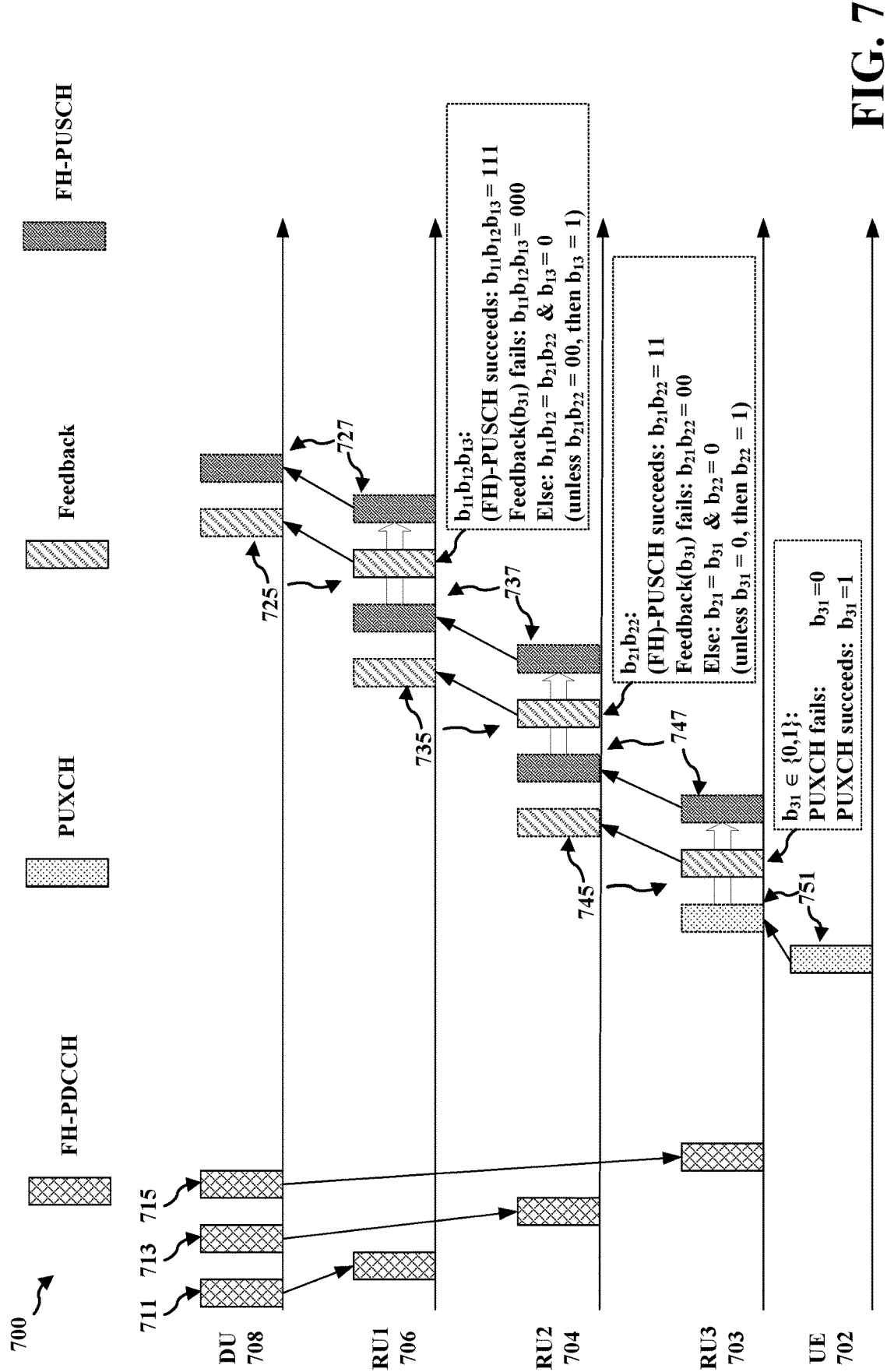
FIG. 7 is a diagram illustrating a feedback format in a multi-hop network.

FIG. 7 is a diagram 700 illustrating a feedback format in a multi-hop network. Diagram 700 illustrates a multi-hop network including a UE 702, intermediate-hop RUs 703, 704, and 706 (e.g., RU3-RU1), and a DU 708 (e.g., a control unit, base station, etc.). Optional transmissions are depicted with dotted lines. As described in relation to FIGS. 4 and 5, a DU 708 (e.g., DU 408 or 508) may transmit control information via FH-PDCCH 711, 713, and 715 to RU1 706 to RU3 703, respectively to allow the RUs 706-703 to participate in the multi-hop network. Control information transmitted via FH-PDCCH 711-715 may include information as described in relation to configuration 510 and/or 512 relating to the time-and-frequency resources via which to receive and transmit transmissions/data (e.g., 751, 745, 747, 735, 737, 725, and 727) associated with UL data communication via the multi-hop network. Control information transmitted via FH-PDCCH 711-715 may include information regarding a feedback format or algorithm for generating feedback. The feedback format or algorithm may determine a number of bits used for transmitting the feedback (e.g., 745, 735, and 725) to a next intermediate-hop RU (e.g., from RU2 to RU1). For example, the feedback 745 may include one bit of information, a "1" or "0," that indicates whether UL data via PUXCH 751 was received at RU3 703.

In some aspects, the first feedback (e.g., feedback 735, "$b_{21}b_{22}$"), in the feedback format described in relation to FIG. 7, may be determined to be received and the first RU is an $(i-1)^{th}$ hop (e.g., a $1^{st}$ hop corresponding to i=2) of n (e.g., 3) hops for the data where i≤n−1, and the first feedback (e.g., feedback 735, "$b_{21}b_{22}$") includes information indicating whether the data (e.g., via FH-PUSCH 747) is received at an RU at hop i (e.g., RU2 704 at hop 2) from the RU at hop i+1 (e.g., RU3 703 at hop 3) (e.g., whether the feedback is "11" (data is received) or any other value (data is not received)), and when the data (e.g., via FH-PUSCH 747) is unsuccessfully received at the RU at hop i (e.g., RU2 704 at hop 2) from the RU at hop i+1 (e.g., RU3 703 at hop 3), the first feedback (e.g., feedback 735) further includes information indicating whether the RU at hop i received feedback (e.g., feedback 745) from the RU at hop i+1, and the feedback received at the RU at hop i from the RU at hop i+1 when feedback is received at the RU at hop i from the RU at hop i+1.

For example, the feedback 735 may include two bits (e.g., bits "$b_{21}$" and "$b_{22}$") that indicate one of four states of the multi-hop network UL data transmission. For example, the four states may include (1) UL data via FH-PUSCH 747 has been received (e.g., "$b_{21}b_{22}$=11"), (2) neither UL data via FH-PUSCH 747 nor feedback 745 has been received (e.g., "$b_{21}b_{22}$=00"), (3) UL data via FH-PUSCH 747 has not been received, but feedback 745 has been received and indicates that UL data via PUXCH 751 was received by RU3 703 (e.g., "$b_{21}b_{22}$=10"), and (4) UL data via FH-PUSCH 747 has not been received, but feedback 745 has been received and indicates that UL data via PUXCH 751 was not received by RU3 703 (e.g., "$b_{21}b_{22}$=01"). The feedback 725 may include three bits (e.g., bits "$b_{11}$," "$b_{12}$," and "$b_{13}$") that indicate one of six states of the multi-hop network UL data transmission. For example, the six states may include (1) UL data via FH-PUSCH 737 has been received (e.g., "$b_{11}b_{12}b_{13}$=111"), (2) neither UL data via FH-PUSCH 737 nor feedback 735 has been received (e.g., "$b_{11}b_{12}b_{13}$=000"), (3) neither UL data via FH-PUSCH 737 has been received at RU1 706 nor UL data via FH-PUSCH 747 has been received at RU2 704 and it is not known whether RU3 703 received UL data via PUXCH 751 (e.g., "$b_{11}b_{12}b_{13}$=001"), (4) UL data via FH-PUSCH 737 has not been received, but feedback 735 has been received and indicates that UL data via FH-PUSCH 747 was received by RU2 704 (e.g., "$b_{11}b_{12}b_{13}$=110"), (5) UL data via FH-PUSCH 737 has not been received, but feedback 735 has been received and indicates that UL data via FH-PUSCH 747 was not received by RU2 704, but was received by RU3 703 (e.g., "$b_{11}b_{12}b_{13}$=100"), and (6) UL data via FH-PUSCH 747 has not been received, but feedback 745 has been received and indicates that UL data via PUXCH 751 was not received by RU3 703 (e.g., "$b_{11}b_{12}b_{13}$=010").

Figure 8:
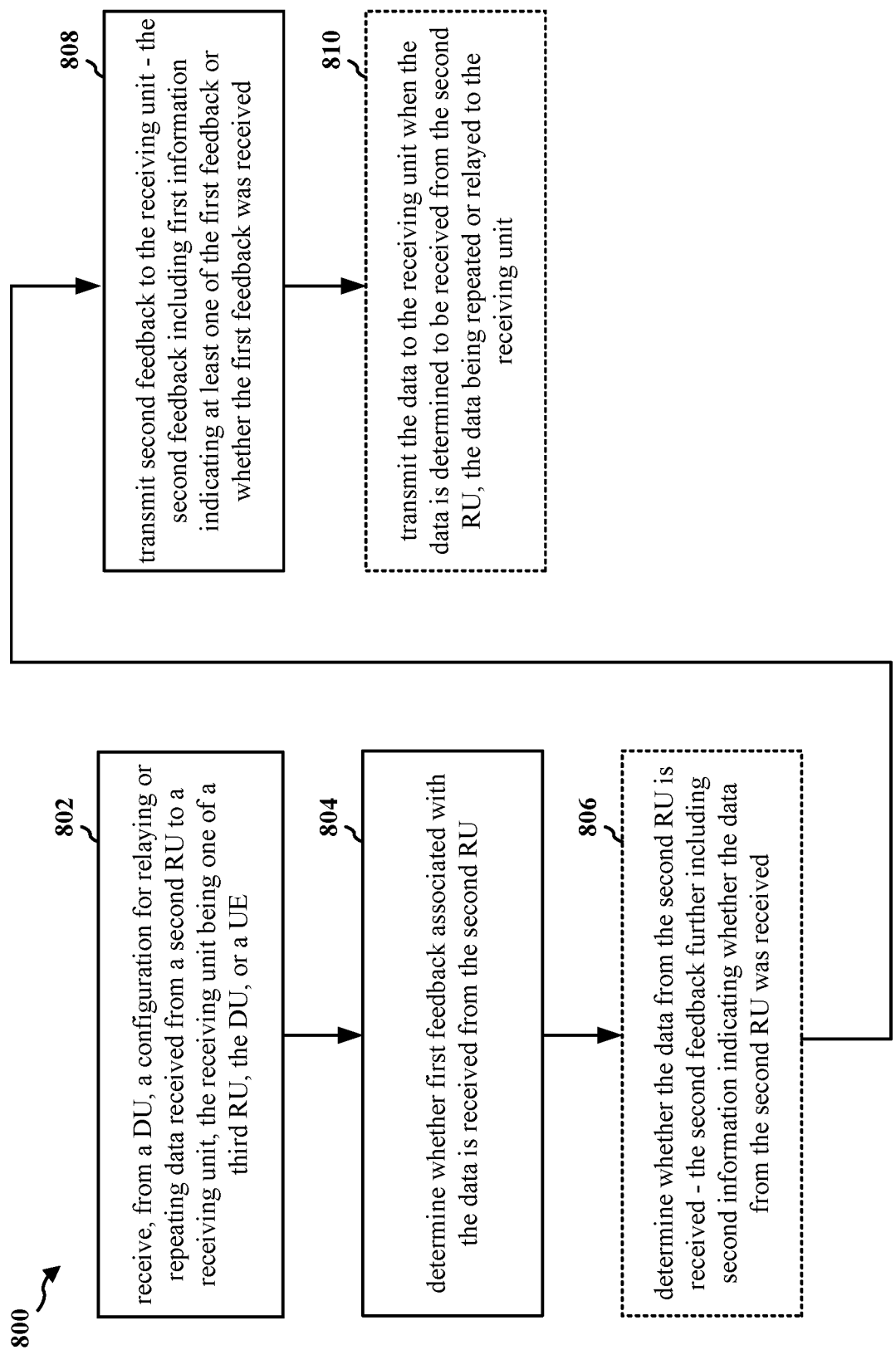
FIG. 8 is a flowchart of a method of wireless communication.

FIG. 8 is a flowchart 800 illustrating a method of wireless communication. The method may be performed by a first RU (e.g., intermediate-hop RU 406, 506, 604/605/606, or 704/706). The first RU may be a UE (e.g., the UE 104; the apparatus 902) or a base station (e.g., the base station 102/180; the apparatus 1002). At 802, the first RU may receive a configuration for relaying or repeating data received from a second RU to a receiving unit, the receiving unit being one of a third RU, the DU, or a UE. The configuration may be received from a DU. For example, 802 may be performed by configuration reception component 940 of FIG. 9 or configuration reception component 1040 of FIG. 10.

For example, referring to FIGS. 4-7, The configuration (e.g., 411/413, 510/512, 611-617, or 711-715) may include time-and-frequency resources used to receive and transmit transmissions associated with UL data communication via the multi-hop network (e.g., transmissions 425-441, 514/518/524/528/530, 625-661, or 725-751). The configuration may indicate a signal-strength threshold based on one or more of a RSRP, a RSRQ, a RSSI, a SNR, or a SINR used to determine if data (e.g., transmitted via a PUXCH or via a FH-PUSCH) has been received at the first RU. The configuration may also include an indication of a number of bits (e.g., b bits) for receiving a first feedback (e.g., feedback 435, 518, 655/645/635, or 745/735) and a second number of bits (e.g., b, b+1, or b+2 bits) for transmitting a second feedback (e.g., feedback 425, 528, 645/635/625, or 735/725). The configuration may also include information about a feedback format as described in relation to FIGS. 6 and 7. The configuration may include information regarding an algorithm or other process for generating feedback (e.g., as described above in relation to FIGS. 6 and 7).

At 804, the first RU may determine whether first feedback associated with the data is received from the second RU. If the feedback is received and it includes an indication that the data was not received at the second RU, the first RU may not monitor time-and-frequency resources specified in the configuration for receiving the data from the second RU. For example, 804 may be performed by feedback reception determination component 942 of FIG. 9 or feedback reception determination component 1042 of FIG. 10. For example, referring to FIGS. 4-7, a first RU (e.g., 406, 506, 604/605/606, and 704/706) may determine whether a first feedback (e.g., 435, 518, 655/645/635, or 745/735) has been received.

In some aspects, the first feedback is determined to be received and the first RU is an $(i-1)^{th}$ hop of n hops (e.g., intermediate hops) for the data where i≤n−1, and the first feedback includes whether an RU at hop i received feedback from an RU at hop i+1, the feedback received at the RU at hop i from the RU at hop i+1 when feedback is received at the RU at hop i from the RU at hop i+1, and whether the data is received at the RU at hop i from the RU at hop i+1. In some aspects, the first feedback is determined to be received and the first RU is an $(i-1)^{th}$ hop of n hops (e.g., intermediate hops) for the data where i≤n−1, and the first feedback includes information indicating whether the data is received at an RU at hop i from the RU at hop i+1, and when the data is unsuccessfully received at the RU at hop i from the RU at hop i+1, the first feedback further includes information indicating whether the RU at hop i received feedback from the RU at hop i+1, and the feedback received at the RU at hop i from the RU at hop i+1 when feedback is received at the RU at hop i from the RU at hop i+1. The first feedback, in some aspects, includes b bits.

At 806, the first RU may determine whether the data from the second RU is received. The first RU may determine that the data has not been received based on the feedback received, at 804, indicating that the second RU did not receive the data. If either (1) the feedback is determined, at 804, not to have been received or (2) the feedback is determined, at 804, to indicate that the second RU received the data, the first RU may monitor time-and-frequency resources specified in the configuration received at 802 for receiving the data. Based on monitoring the time-and-frequency resources specified in the configuration received at 802 for receiving the data, the first RU may determine, at 806, if the data was received. In some aspects, the first RU may measure one or more of a RSRP, a RSRQ, a RSSI, a SNR, or a SINR and compare it to a signal-strength threshold (e.g., a pre-configured signal-strength threshold or a signal-strength threshold specified in the configuration received at 802) to determine whether the data was received. For example, 806 may be performed by data reception determination component 944 of FIG. 9 or data reception determination component 1044 of FIG. 10. For example, referring to FIGS. 4-7, a first RU (e.g., 406, 506, 604/605/606, and 704/706) may determine (e.g., 526) whether the data (e.g., 437, 524, 657/647/637, or 747/737) from the second RU has been received.

At 808, the first RU may transmit second feedback to the receiving unit and/or a control unit, the second feedback including first information indicating at least one of the first feedback or whether the first feedback was received. The second feedback, in some aspects, may be based on the determination, at 804, whether the first feedback was received from the second RU and/or the determination, at 806, whether the data was received from the second RU. The second feedback may be formatted or generated based on information regarding a feedback format or an algorithm for generating feedback included in the configuration received at 802. In some aspects, the second feedback may include one of the first feedback or the information included in the first feedback. The second feedback may also indicate whether the first feedback was received and whether the data was received from the second RU. For example, 808 may be performed by data reception determination component 946 of FIG. 9 or data reception determination component 1046 of FIG. 10. The second feedback may include one of b, b+1, or b+2 bits.

For example, referring to FIGS. 4-7, the first RU (e.g., 406, 506, 604/605/606, and 704/706) may transmit second feedback (e.g., 425, 528, 645/635/625, or 735/725). Second feedback may include information based on determining (e.g., 520/526 or at 804/806) whether a first feedback (e.g., 435, 518, 655/645/635, or 745/735) has been received and/or whether data (e.g., 437, 524, 657/647/637, or 747/737) has been received from the second RU (e.g., 404, 504, 605/604/603, 704/703). The second feedback may include b+2 bits as discussed in relation to FIG. 6 (e.g., b bits of a first received feedback and two additional bits indicating whether the first feedback was received and whether data was received from the second RU). In some aspects, the second feedback may include b+1 bits as discussed in relation to FIG. 7 (e.g., b+1 bits indicating (1) whether the data was received from the second RU, (2) if the data was not received from the second RU, whether the feedback was received from the second RU, and (3) if the feedback was received from the second RU, the contents of the b bits received from the second RU).

At 810, the first RU may transmit the data to the receiving unit or the control unit when the data is determined to be received from the second RU. The data may be repeated or relayed to the receiving unit or the control unit. For example, 810 may be performed by data relay component 948 of FIG. 9 or data relay component 1048 of FIG. 10. For example, referring to FIGS. 4-7, the first RU (e.g., 406, 506, 604/605/606, and 704/706) may transmit (e.g., relay) the data (e.g., 427, 530, 647/637/627, or 737/727) received from the second RU (e.g., 404, 504, 605/604/603, 704/703) to a receiving/control unit (e.g., 408, 508, 605/606/608, and 706/708).

Figure 9:
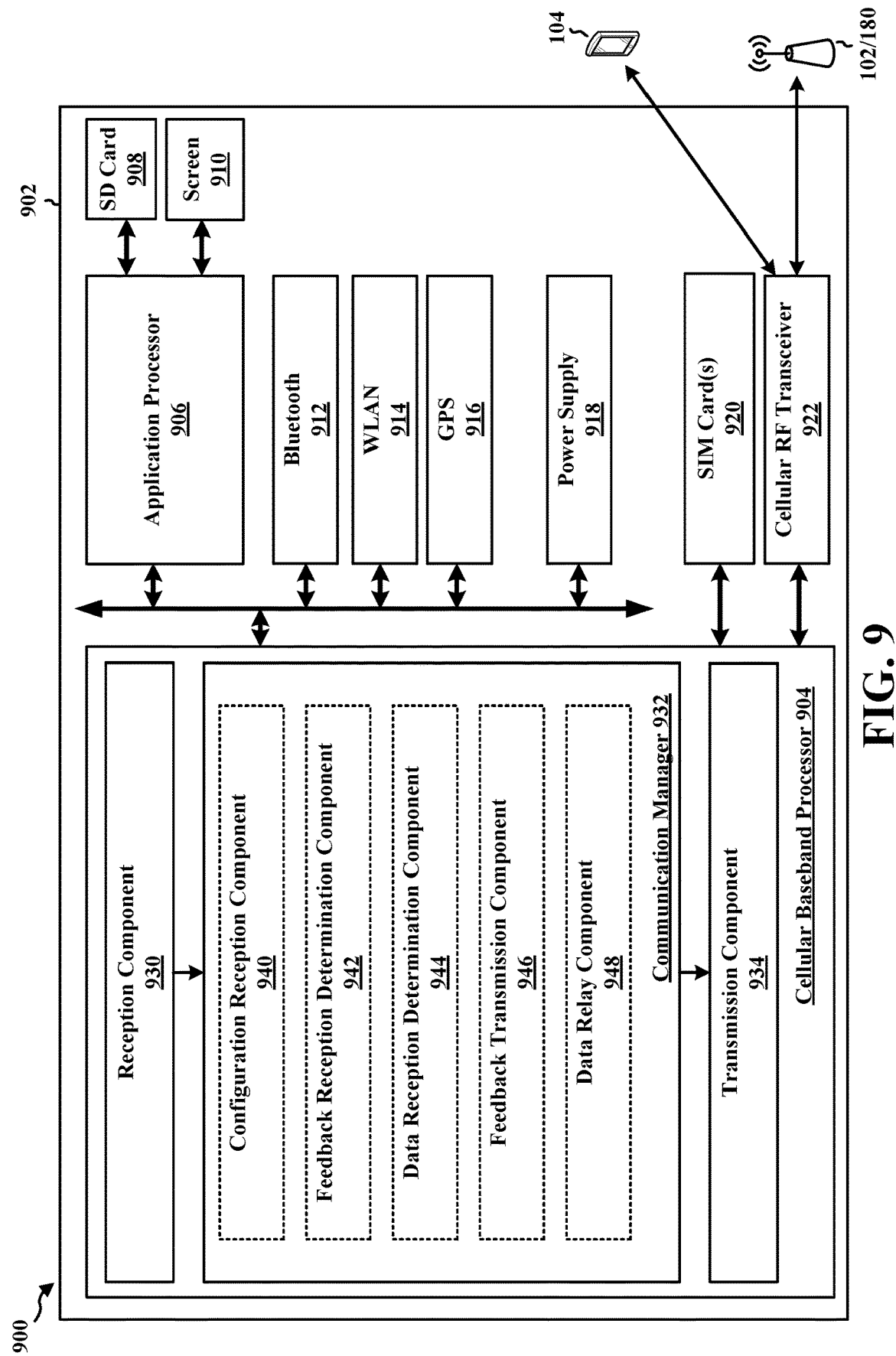
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a configuration reception component 940 that is configured to receive, from a DU, a configuration for relaying or repeating data received from a second RU to a receiving unit, the receiving unit being one of a third RU, the DU, or a UE, e.g., as described in connection with 802 of FIG. 8. The communication manager 932 further includes a feedback reception determination component 942 that receives input in the form of configuration information from the configuration reception component 940 and is configured to determine whether first feedback associated with the data is received from the second RU (based on the configuration), e.g., as described in connection with 804 of FIG. 8. The communication manager 932 further includes a data reception determination component 944 that receives input in the form of configuration information from the configuration reception component 940 and, in some aspects, feedback from the second RU and is configured to determine whether the data from the second RU is received, e.g., as described in connection with 806 of FIG. 8. The communication manager 932 further includes a feedback transmission component 946 that receives input in the form of configuration information from the configuration reception component 940 and is configured to transmit second feedback to the receiving unit, the second feedback including first information indicating at least one of the first feedback or whether the first feedback was received, e.g., as described in connection with 808 of FIG. 8. The communication manager 932 further includes a data relay component 948 that receives input in the form of configuration information from the configuration reception component 940 and, in some aspects, data from a second RU and is configured to transmit the data to the receiving unit when the data is determined to be received from the second RU, the data being repeated or relayed to the receiving unit, e.g., as described in connection with 810 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a DU, a configuration for relaying or repeating data received from a second RU to a receiving unit, the receiving unit being one of a third RU, the DU, or a UE. In one configuration, the apparatus 902, and in particular the cellular baseband processor 904, may further include means for determining whether first feedback associated with the data is received from the second RU. In one configuration, the apparatus 902, and in particular the cellular baseband processor 904, may further include means for determining whether the data from the second RU is received. In one configuration, the apparatus 902, and in particular the cellular baseband processor 904, may further include means for transmitting second feedback to the receiving unit, the second feedback including first information indicating at least one of the first feedback or whether the first feedback was received. In one configuration, the apparatus 902, and in particular the cellular baseband processor 904, may further include means for transmitting the data to the receiving unit when the data is determined to be received from the second RU. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
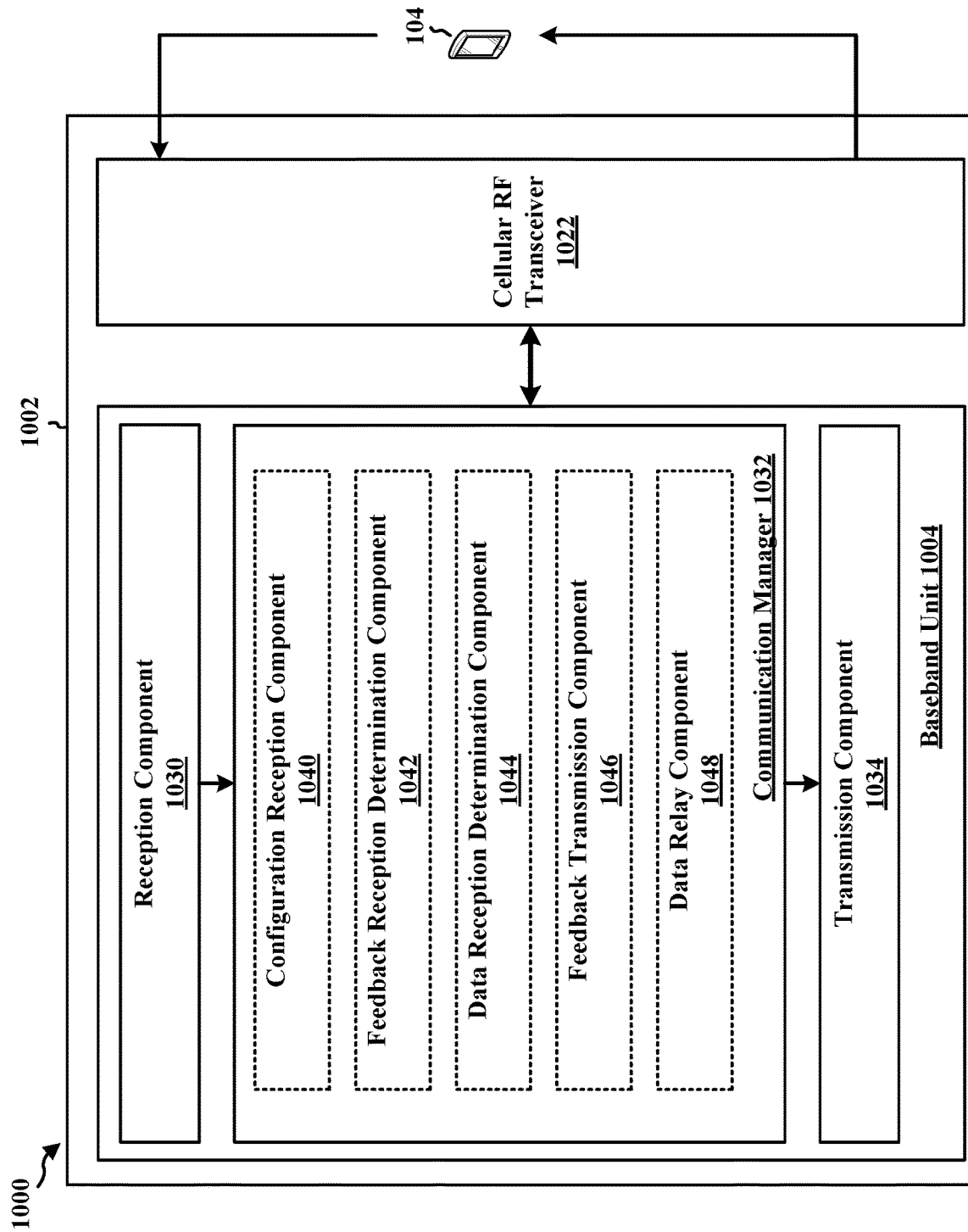
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a configuration reception component 1040 that is configured to receive, from a DU, a configuration for relaying or repeating data received from a second RU to a receiving unit, the receiving unit being one of a third RU, the DU, or a UE, e.g., as described in connection with 802 of FIG. 8. The communication manager 1032 further includes a feedback reception determination component 1042 that receives input in the form of configuration information from the configuration reception component 1040 and is configured to determine whether first feedback associated with the data is received from the second RU (based on the configuration), e.g., as described in connection with 804 of FIG. 8. The communication manager 1032 further includes a data reception determination component 1044 that receives input in the form of configuration information from the configuration reception component 1040 and, in some aspects, feedback from the second RU and is configured to determine whether the data from the second RU is received, e.g., as described in connection with 806 of FIG. 8. The communication manager 1032 further includes a feedback transmission component 1046 that receives input in the form of configuration information from the configuration reception component 1040 and is configured to transmit second feedback to the receiving unit, the second feedback including first information indicating at least one of the first feedback or whether the first feedback was received, e.g., as described in connection with 808 of FIG. 8. The communication manager 1032 further includes a data relay component 1048 that receives input in the form of configuration information from the configuration reception component 1040 and, in some aspects, data from a second RU and is configured to transmit the data to the receiving unit when the data is determined to be received from the second RU, the data being repeated or relayed to the receiving unit, e.g., as described in connection with 810 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a DU, a configuration for relaying or repeating data received from a second RU to a receiving unit, the receiving unit being one of a third RU, the DU, or a UE. In one configuration, the apparatus 1002, and in particular the cellular baseband processor 1004, may further include means for determining whether first feedback associated with the data is received from the second RU. In one configuration, the apparatus 1002, and in particular the cellular baseband processor 1004, may further include means for determining whether the data from the second RU is received. In one configuration, the apparatus 1002, and in particular the cellular baseband processor 1004, may further include means for transmitting second feedback to the receiving unit, the second feedback including first information indicating at least one of the first feedback or whether the first feedback was received. In one configuration, the apparatus 1002, and in particular the cellular baseband processor 1004, may further include means for transmitting the data to the receiving unit when the data is determined to be received from the second RU. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In some aspects of wireless communication, e.g., 5G NR, a single RU may be used as an intermediate hop for UL data (e.g., transmitted via a PUCCH, PUSCH, or, generically, PUXCH) between an UL-data source device (e.g., a UE) and an UL-data destination device (e.g., a UE, RU, or DU). An intermediate-hop RU may relay or repeat, to the UL-data destination device, (1) UL data received via PUXCH as UL data via FH-PUSCH and/or (2) feedback as to whether the UL data via PUXCH was received at the intermediate-hop RU. The feedback may be used by the UL-data destination device (e.g., a UE, RU, or DU) to (1) schedule reception of the UL data via FH-PUSCH, (2) request a retransmission of the UL data via PUXCH based on the feedback indicating the failure of the intermediate-hop RU to receive the UL data via PUXCH, or (3) reallocate resources allocated for receiving the UL data via FH-PUSCH based on the feedback indicating the failure of the intermediate-hop RU to receive the UL data via PUXCH.

When using multiple intermediate hops, an UL-data destination device may not receive the UL data (e.g., via FH-PUSCH) based on a failure of any of the intermediate-hop RUs to receive the UL data (e.g., via a PUXCH or FH-PUSCH). As in the single-hop example above, if an UL data reception fails at the UL-data destination device, the UL-data destination device may request a retransmission of the UL data. It may be beneficial to identify intermediate-hop RUs at which the UL data was successfully received so as to request a retransmission from a particular intermediate-hop RU that (1) received (e.g., successfully received) the UL data and (2) is the fewest hops away from the UL-data destination device. Accordingly, the feedback formats described above in relation to FIGS. 6 and 7 may identify one or more intermediate-hop RUs that received the UL data to allow a retransmission that traverses fewer than all of the intermediate-hop RUs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first RU, including receiving, from a control unit, a configuration for relaying or repeating data received from a second RU to a receiving unit; determining whether first feedback associated with the data is received from the second RU; and transmitting second feedback to at least one of the receiving unit or the control unit, the second feedback including first information indicating at least one of the first feedback or whether the first feedback was received.

Aspect 2 is the method of aspect 1, further including determining whether the data from the second RU is received, where the second feedback further includes second information indicating whether the data from the second RU was received.

Aspect 3 is the method of aspect 2, further including transmitting the data to the receiving unit when the data is determined to be received from the second RU, the data being repeated or relayed to the receiving unit.

Aspect 4 is the method of any of aspects 1 to 3, where the first feedback is determined to be received, and the first feedback includes whether the data is received at the second RU.

Aspect 5 is the method of any of aspects 1 to 3, where the first feedback is determined to be received and the first RU is an (i−1)th hop of n hops for the data where i≤n−1, and the first feedback includes whether an RU at hop i received feedback from an RU at hop i+1, the feedback received at the RU at hop i from the RU at hop i+1 when feedback is received at the RU at hop i from the RU at hop i+1, and whether the data is received at the RU at hop i from the RU at hop i+1.

Aspect 6 is the method of any of aspects 1 to 3, where the first feedback is determined to be received and the first RU is an $(i-1)^{th}$ hop of n hops for the data where i≤n−1, and the first feedback includes information indicating whether the data is received at an RU at hop i from the RU at hop i+1, and when the data is unsuccessfully received at the RU at hop i from the RU at hop i+1, the first feedback further includes information indicating whether the RU at hop i received feedback from the RU at hop i+1, and the feedback received at the RU at hop i from the RU at hop i+1 when feedback is received at the RU at hop i from the RU at hop i+1.

Aspect 7 is the method of any of aspects 1 to 6, where the first feedback comprises b bits.

Aspect 8 is the method of aspect 7, where the transmitted second feedback comprises one of b+1 or b+2 bits.

Aspect 9 is the method of any of aspects 1 to 8, where the control unit comprises one of a DU, a base station, or a UE and the receiving unit comprises one of a third RU, the DU, the control unit, or a UE.

Aspect 10 is the method of any of aspects 1 to 9, where the configuration for relaying or repeating the data received from the second RU to the receiving unit further comprises an indication of a number of bits b for receiving the first feedback, the transmitted second feedback comprising one of b+1 bits or b+2 bits.

Aspect 11 is an apparatus for wireless communication including at least one processor coupled to a memory and configured to implement a method as in any of aspects 1 to 10.

Aspect 12 is an apparatus for wireless communication including means for implementing a method as in any of aspects 1 to 10.

Aspect 13 is a computer-readable medium storing computer executable code, where the code when executed by a processor causes the processor to implement a method as in any of aspects 1 to 10.

What is claimed is:

1. A method of wireless communication of a first radio unit (RU), comprising:
   receiving, from a control unit, a first configuration for relaying or repeating data received from a second RU to a receiving unit and a second configuration indicating a first number of bits, b, for receiving a first feedback from the second RU and a second number of bits, b+1 bits or b+2 bits, for transmitting a second feedback to at least one of the receiving unit or the control unit;
   determining whether the first feedback associated with the data is received from the second RU; and
   transmitting the second feedback to at least one of the receiving unit or the control unit, the second feedback including first information indicating at least one of the first feedback or whether the first feedback was received.

2. The method of claim 1, further comprising determining whether the data from the second RU is received, wherein the second feedback further includes second information indicating whether the data from the second RU was received.

3. The method of claim 2, further comprising transmitting the data to the receiving unit when the data is determined to be received from the second RU, the data being repeated or relayed to the receiving unit.

4. The method of claim 1, wherein the first feedback is determined to be received, and the first feedback includes whether the data is received at the second RU.

5. The method of claim 1, wherein the first feedback is determined to be received and the first RU is an $(i-1)^{th}$ hop of n hops for the data where i≤n−1, and the first feedback includes whether an RU at hop i received feedback from an RU at hop i+1, the feedback received at the RU at hop i from the RU at hop i+1 when feedback is received at the RU at hop i from the RU at hop i+1, and whether the data is received at the RU at hop i from the RU at hop i+1.

6. The method of claim 1, wherein the first feedback is determined to be received and the first RU is an $(i-1)^{th}$ hop of n hops for the data where i≤n−1, and the first feedback includes information indicating whether the data is received at an RU at hop i from the RU at hop i+1, and when the data is unsuccessfully received at the RU at hop i from the RU at hop i+1, the first feedback further includes information indicating whether the RU at hop i received feedback from the RU at hop i+1, and the feedback received at the RU at hop i from the RU at hop i+1 when feedback is received at the RU at hop i from the RU at hop i+1.

7. The method of claim 1, wherein the first feedback comprises b bits.

8. The method of claim 7, wherein the transmitted second feedback comprises one of b+1 bits or b+2 bits.

9. The method of claim 1, wherein the control unit comprises one of a distributed unit (DU), a base station, or a user equipment (UE) and the receiving unit comprises one of a third RU, the DU, the control unit, or a UE.

10. The method of claim 1, wherein the first feedback indicates a state of a transmission of the data associated with the second RU via the first number of bits and the second feedback indicates, via the second number of bits, the state of the transmission of the data associated with the second RU and a state of the transmission of the data associated with the first feedback, wherein a state of the transmission of the data associated with a particular RU comprises at least one of an indication of a closest RU that received the data known to the particular RU or an indication that the closest RU that received the data is not known to the particular RU.

11. An apparatus for wireless communication at a first radio unit (RU), comprising:
   a memory; and
   at least one processor coupled to the memory and configured to:
      receive, from a control unit, a first configuration for relaying or repeating data received from a second RU to a receiving unit and a second configuration indicating a first number of bits, b, for receiving a first feedback from the second RU and a second number of bits, b+1 bits or b+2 bits, for transmitting a second feedback to at least one of the receiving unit or the control unit;
      determine whether the first feedback associated with the data is received from the second RU; and
      transmit the second feedback to at least one of the receiving unit or the control unit, the second feedback including first information indicating at least one of the first feedback or whether the first feedback was received.

12. The apparatus of claim 11, wherein the at least one processor is further configured to determine whether the data from the second RU is received, wherein the second feedback further includes second information indicating whether the data from the second RU was received.

13. The apparatus of claim 12, wherein the at least one processor is further configured to transmit the data to the receiving unit when the data is determined to be received from the second RU, the data being repeated or relayed to the receiving unit.

14. The apparatus of claim 11, wherein the first feedback is determined to be received, and the first feedback includes whether the data is received at the second RU.

15. The apparatus of claim 11, wherein the first feedback is determined to be received and the first RU is an $(i-1)^{th}$ hop of n hops for the data where i≤n−1, and the first feedback includes whether an RU at hop i received feedback from an RU at hop i+1, the feedback received at the RU at hop i from the RU at hop i+1 when feedback is received at the RU at hop i from the RU at hop i+1, and whether the data is received at the RU at hop i from the RU at hop i+1.

16. The apparatus of claim 11, wherein the first feedback is determined to be received and the first RU is an $(i-1)^{th}$ hop of n hops for the data where i≤n−1, and the first feedback includes information indicating whether the data is received at an RU at hop i from the RU at hop i+1, and when the data is unsuccessfully received at the RU at hop i from the RU at hop i+1, the first feedback further includes information indicating whether the RU at hop i received feedback from the RU at hop i+1, and the feedback received at the RU at hop i from the RU at hop i+1 when feedback is received at the RU at hop i from the RU at hop i+1.

17. The apparatus of claim 11, wherein the first feedback comprises b bits.

18. The apparatus of claim 17, wherein the transmitted second feedback comprises b+1 bits or b+2 bits.

19. The apparatus of claim 11, wherein the control unit comprises one of a distributed unit (DU), a base station, or a user equipment (UE) and the receiving unit comprises one of a third RU, the DU, the control unit, or a UE.

20. The apparatus of claim 11, wherein the first feedback is configured to indicate a state of a transmission of the data associated with the second RU via the first number of bits and the second feedback is configured to indicate, via the second number of bits, the state of the transmission of the data associated with the second RU and a state of the transmission of the data associated with the first feedback, wherein a state of the transmission of the data associated with a particular RU comprises at least one of an indication of a closest RU that received the data known to the particular RU or an indication that the closest RU that received the data is not known to the particular RU.

21. An apparatus for wireless communication at a first radio unit (RU), comprising:
means for receiving, from a control unit, a first configuration for relaying or repeating data received from a second RU to a receiving unit and a second configuration indicating a first number of bits, b, for receiving a first feedback from the second RU and a second number of bits, b+1 bits or b+2 bits, for transmitting a second feedback to at least one of the receiving unit or the control unit;
means for determining whether the first feedback associated with the data is received from the second RU; and
means for transmitting the second feedback to at least one of the receiving unit or the control unit, the second feedback including first information indicating at least one of the first feedback or whether the first feedback was received.

22. The apparatus of claim 21, further comprising means for determining whether the data from the second RU is received, wherein the second feedback further includes second information indicating whether the data from the second RU was received.

23. The apparatus of claim 22, further comprising means for transmitting the data to the receiving unit when the data is determined to be received from the second RU, the data being repeated or relayed to the receiving unit.

24. The apparatus of claim 21, wherein the first feedback is determined to be received, and the first feedback includes whether the data is received at the second RU.

25. The apparatus of claim 21, wherein the first feedback is determined to be received and the first RU is an $(i-1)^{th}$ hop of n hops for the data where i≤n−1, and the first feedback includes whether an RU at hop i received feedback from an RU at hop i+1, the feedback received at the RU at hop i from the RU at hop i+1 when feedback is received at the RU at hop i from the RU at hop i+1, and whether the data is received at the RU at hop i from the RU at hop i+1.

26. The apparatus of claim 21, wherein the first feedback is determined to be received and the first RU is an $(i-1)^{th}$ hop of n hops for the data where i≤n−1, and the first feedback includes information indicating whether the data is received at an RU at hop i from the RU at hop i+1, and when the data is unsuccessfully received at the RU at hop i from the RU at hop i+1, the first feedback further includes information indicating whether the RU at hop i received feedback from the RU at hop i+1, and the feedback received at the RU at hop i from the RU at hop i+1 when feedback is received at the RU at hop i from the RU at hop i+1.

27. The apparatus of claim 21, wherein the first feedback comprises b bits and the transmitted second feedback comprises one of b+2 bits or b+1 bits.

28. The apparatus of claim 21, wherein the control unit comprises one of a distributed unit (DU), a base station, or a user equipment (UE) and the receiving unit comprises one of a third RU, the DU, the control unit, or a UE.

29. The apparatus of claim 21, wherein the first feedback is configured to indicate a state of a transmission of the data associated with the second RU via the first number of bits and the second feedback is configured to indicate, via the second number of bits, the state of the transmission of the data associated with the second RU and a state of the transmission of the data associated with the first feedback, wherein a state of the transmission of the data associated with a particular RU comprises at least one of an indication of a closest RU that received the data known to the particular RU or an indication that the closest RU that received the data is not known to the particular RU.

30. A non-transitory computer-readable medium of a first radio unit (RU) storing computer executable code, the code when executed by a processor causes the processor to:
receive, from a control unit, a first configuration for relaying or repeating data received from a second RU to a receiving unit and a second configuration indicating a first number of bits, b, for receiving a first feedback from the second RU and a second number of bits, b+1 bits or b+2 bits, for transmitting a second feedback to at least one of the receiving unit or the control unit;
determine whether the first feedback associated with the data is received from the second RU; and
transmit the second feedback to at least one of the receiving unit or the control unit, the second feedback including first information indicating at least one of the first feedback or whether the first feedback was received.

* * * * *